(12) United States Patent
Okamoto

(10) Patent No.: US 7,661,645 B2
(45) Date of Patent: *Feb. 16, 2010

(54) FIXTURE FOR DISPLAY UNIT FOR ALLOWING DISPLAYED IMAGE TO BE SEEN WITH EASE EVEN UPON VIBRATING

(75) Inventor: Shinya Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/812,190

(22) Filed: Jun. 15, 2007

(65) Prior Publication Data

US 2008/0035829 A1 Feb. 14, 2008

Related U.S. Application Data

(62) Division of application No. 10/290,238, filed on Nov. 8, 2002, now Pat. No. 7,341,235.

(30) Foreign Application Priority Data

Nov. 12, 2001 (JP) ............................. 2001-346604

(51) Int. Cl.
   *A47H 1/10* (2006.01)
(52) U.S. Cl. ...................... 248/324; 248/919; 211/134
(58) Field of Classification Search ................ 248/323, 248/324, 325, 327, 122.1, 123.11, 125.1, 248/919, 923; 108/94, 95, 96; 312/196; 211/134, 153, 90.02; 348/825, 827; 361/FOR. 104, 361/FOR. 105
See application file for complete search history.

(56) References Cited

U.S. PATENT DOCUMENTS

| | | | |
|---|---|---|---|
| 3,726,498 A | 4/1973 | Schlegel | |
| 3,774,873 A | 11/1973 | Krogsrud | |
| 4,470,106 A | 9/1984 | Norton | |
| 4,577,788 A | 3/1986 | Richardson | |
| 4,836,478 A * | 6/1989 | Sweere | 248/279.1 |
| 4,964,606 A * | 10/1990 | Beam et al. | 248/333 |

(Continued)

FOREIGN PATENT DOCUMENTS

CN 2193279 Y 3/1995

(Continued)

*Primary Examiner*—A. Joseph Wujciak, III
(74) *Attorney, Agent, or Firm*—McGinn IP Law Group, PLLC

(57) ABSTRACT

A rack has a first shelf and a second shelf disposed upwardly of said first shelf, and a display unit is placed on the first shelf and disposed between the first shelf and the second shelf. The display unit is fixed to the second shelf by a display unit fixture. The display unit fixture has a display unit fixing member fixed to said display unit, i.e., a first fixing member, and a second fixing member having a magnet which can be attracted to a lower surface of the second shelf. The second fixing member can removably be fixed selectively to a desired position on the lower surface of said second shelf. The first fixing member and said second fixing member are connected by shafts to respective opposite ends of a connector for rotation about the shafts and are also rotatable with respect to the connector within a plane or planes perpendicular to the display screen of the display unit and a horizontal plane.

17 Claims, 4 Drawing Sheets

U.S. PATENT DOCUMENTS

| | | | |
|---|---|---|---|
| 4,993,676 A * | 2/1991 | Fitts et al. | 248/317 |
| 5,143,338 A | 9/1992 | Eberlin | |
| 5,154,390 A | 10/1992 | Bain et al. | |
| 5,180,136 A | 1/1993 | Sova | |
| 5,381,991 A * | 1/1995 | Stocker | 248/206.5 |
| 5,400,993 A * | 3/1995 | Hamilton | 248/279.1 |
| 5,584,253 A | 12/1996 | Stranford | |
| 5,738,320 A * | 4/1998 | Matos et al. | 248/242 |
| 5,924,665 A | 7/1999 | Sweere et al. | |
| 5,988,571 A | 11/1999 | Ward et al. | |
| 5,996,954 A | 12/1999 | Rosen et al. | |
| 6,061,104 A | 5/2000 | Evanicky et al. | |
| 6,247,205 B1 | 6/2001 | Damadian et al. | |
| D455,949 S | 4/2002 | Huang | |
| 6,398,178 B1 | 6/2002 | Azola et al. | |
| 6,466,278 B1 * | 10/2002 | Harrison et al. | 348/836 |
| 6,478,275 B1 | 11/2002 | Huang | |
| 6,543,734 B2 | 4/2003 | Yeh | |
| 6,595,482 B1 | 7/2003 | Armbruster | |
| 7,019,786 B2 * | 3/2006 | Lee | 348/383 |
| 7,077,373 B1 * | 7/2006 | Hoebener et al. | 248/278.1 |
| 7,108,235 B2 * | 9/2006 | Kanashiki | 248/125.1 |
| 7,341,235 B2 * | 3/2008 | Okamoto | 248/638 |

FOREIGN PATENT DOCUMENTS

| | | |
|---|---|---|
| DE | 94 09 337 U | 7/1994 |
| EP | 02 02 4477 8 | 6/1994 |
| EP | 1 103 423 A2 | 5/2001 |
| GB | 2 206 279 A | 1/1989 |
| JP | 63-175224 | 11/1988 |
| JP | 04-149786 | 5/1992 |
| JP | 5-80306 | 4/1993 |
| JP | 3015233 | 6/1995 |
| JP | 08-099450 | 4/1996 |
| JP | 3057684 | 3/1999 |
| JP | 11-259050 | 9/1999 |
| JP | 11-327783 | 11/1999 |

* cited by examiner

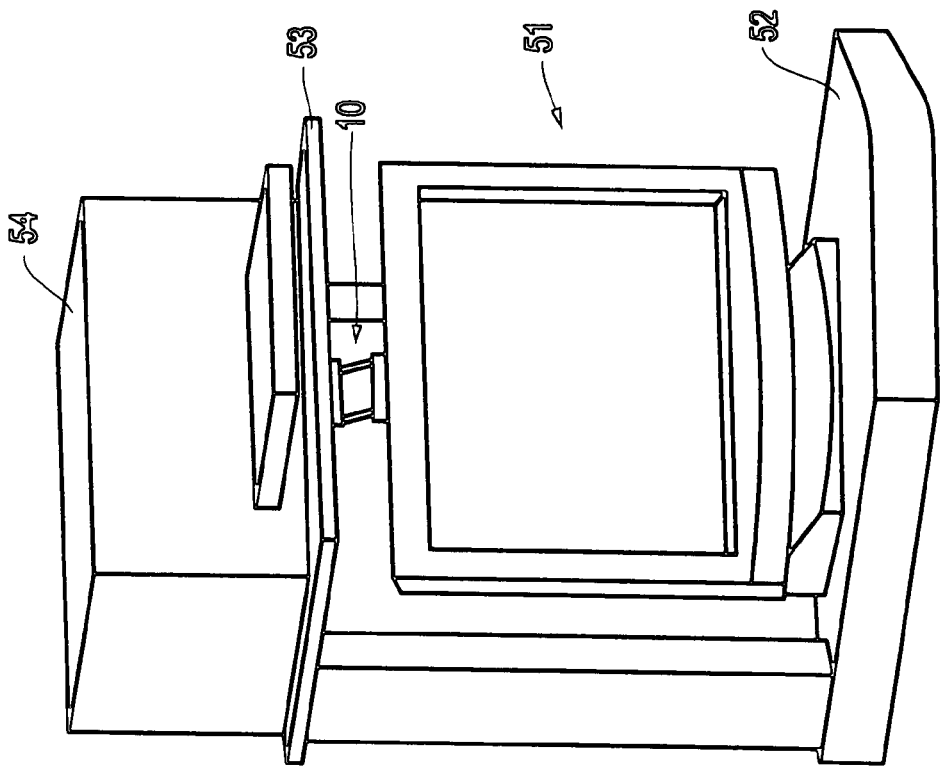
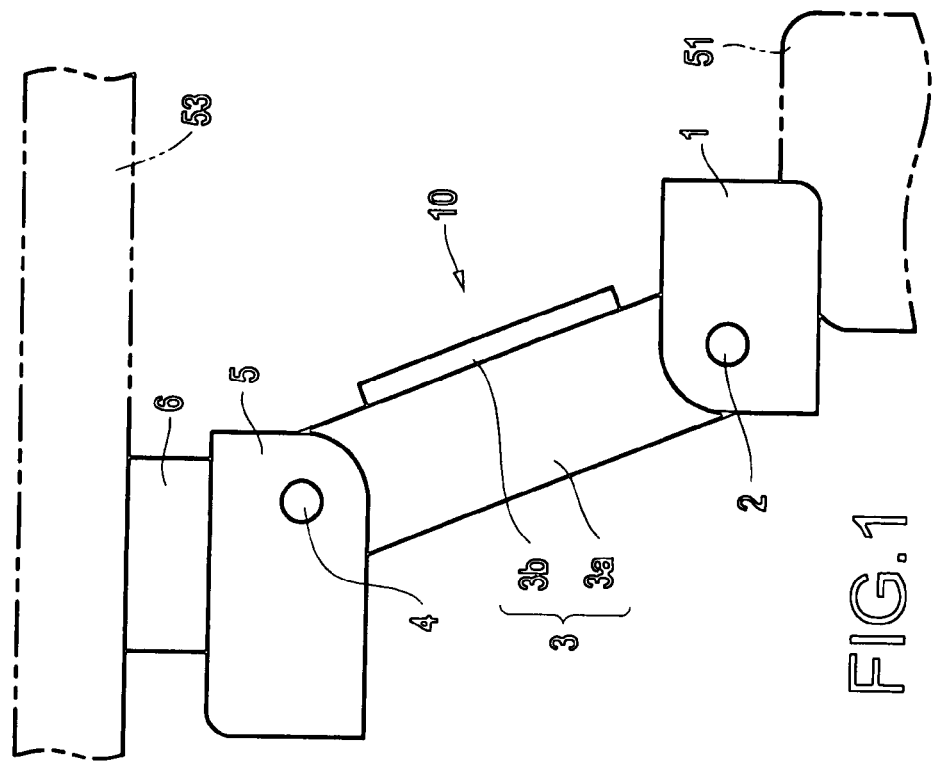

FIXTURE FOR DISPLAY UNIT FOR ALLOWING DISPLAYED IMAGE TO BE SEEN WITH EASE EVEN UPON VIBRATING

The present Application is a Divisional Application of U.S. patent application Ser. No. 10/290,238 filed on Nov. 8, 2002 now U.S. Pat. No. 7,341,235.

BACKGROUND OF THE INVENTION

1. Field of the Invention

The present invention relates to a fixture for fixing a display unit, in particular a thin display unit such as a liquid crystal display unit, to a shelf.

2. Description of the Related Art

Display units such as liquid crystal display units connected to personal computers, for example, are usually placed on a dedicated rack or desk. Such a dedicated rack or desk is called a personal computer rack or personal computer desk, for example. Generally, a display unit connected to a main unit of a personal computer is placed on a shelf on the rack or desk, and a peripheral device, particularly a printer, of the personal computer is placed on another shelf positioned above and integrally formed with the display unit shelf.

The personal computer rack or personal computer desk allows the main unit of the personal computer, the display unit, and the peripheral device, particularly a printer to be accommodated in a small space.

However, if a display unit is put on the personal computer rack or personal computer desk, when the peripheral device operates, e.g., when the printer discharges a printed sheet, it may produce vibrations, which vibrate the personal computer rack or personal computer desk, causing the display unit to resonate. When the display unit resonates, it produces relatively large vibrations, which tend to make it difficult for the user to see the displayed images clearly.

SUMMARY OF THE INVENTION

The present invention is accomplished in view of the aforementioned problem in the prior art, it is therefore an object of the present invention to provide a display unit fixture for preventing a display unit from resonating upon vibrations and allowing the user to see displayed images with ease.

According to the present invention, there is provided a fixture for fixing a display unit on a rack having a first shelf and a second shelf disposed upwardly of the first shelf, the display unit being placed on the first shelf and disposed between the first shelf and the second shelf. The fixture has a first fixing member fixed to the display unit and a second fixing member removably fixed selectively to a plurality of positions on a surface of the second shelf which faces the first shelf. The first fixing member and the second fixing member are connected to each other by a connector for rotation within a plane or planes including an axis interconnecting a joint of the first fixing member to the connector and a joint of the second fixing member to the connector.

The fixture allows the display unit placed on the first shelf to be also fixed to the second shelf. Even when vibrations occur at the time a printer disposed on the second shelf discharges a printed sheet, the display unit is prevented from resonating by the fixture. Therefore, the user can see displayed images on the display unit with ease even when vibrations occur.

The first fixing member and the second fixing member are connected to the connector for rotation in at least a given plane, and the second fixing member is removably fixed to the second shelf at a selected one of the positions. Therefore, after the display screen of the display unit is tilted upwardly or downwardly or to the left or the right, the display unit can be fixed to the second shelf again.

For removably fixing the second fixing member to any one of the positions on the second shelf, the second shelf should preferably be made of a material for attracting a magnet, and the second fixing member should preferably have a magnet. While the first fixing member and the second fixing member may be connected to the connector for rotation within any planes including the axis interconnecting the joint of the first fixing member and the joint of the second fixing member, it is enough for the first fixing member and the second fixing member to be connected to the connector for rotation within one and the same plane. The latter arrangement is preferable as it is simpler.

To allow the first fixing member and the second fixing member to be connected to the connector for rotation within one and the same plane, the connector may have holes defined in opposite ends thereof, and the first fixing member and the second fixing member may have holes defined therein which are held in alignment with the holes defined in the opposite ends of the connector, with a first shaft extending through the hole defined in one of the opposite ends of the connector and the hole defined in the first fixing member, and a second shaft extending through the hole defined in the other of the opposite ends of the connector and the hole defined in the second fixing member.

The first fixing member should preferably be fixed to an uppermost end of the display unit for effectively suppressing resonation of the display unit. The first fixing member may be fixed to the display unit by a double-sided adhesive tape.

The above and other objects, features, and advantages of the present invention will become apparent from the following description with reference to the accompanying drawings which illustrate examples of the present invention.

BRIEF DESCRIPTION OF THE DRAWINGS

FIG. 1 is a side elevational view of a display unit fixture according to the present invention;

FIG. 2 is a perspective view showing the manner in which a display unit is fixed in place by the display unit fixture according to the present invention;

DESCRIPTION OF THE PREFERRED EMBODIMENT

Figure 3:
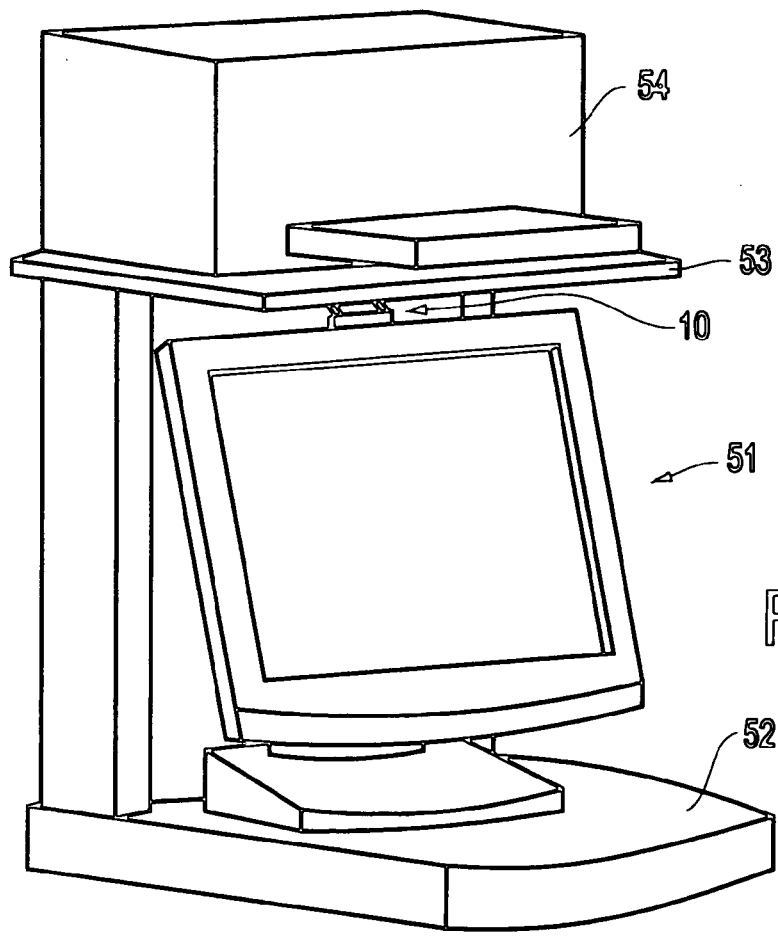
FIG. 3 is a perspective view showing the display unit whose display screen is tilted upwardly from the position shown in FIG. 2.

A specific display unit according to an embodiment of the present invention will be described below with reference to Figures. As shown in FIG. 2, display unit 51 and printer 54 which may be connected to a main unit of a personal computer are placed respectively on lower shelf 52 and upper shelf 53 of a personal computer rack. Display unit 51 comprises a liquid crystal display unit, for example, and has a thin display panel. The display panel is supported on a support mounted on shelf 52 for turning its display screen to the left or the right about a vertical axis and also turning the display screen from a vertical plane through a desired angle within a plane perpendicular to the display screen and a horizontal plane. Display unit fixture 10 according to the present invention is interposed between the upper end of the display panel and shelf 53.

As shown in FIG. 1, display unit fixture 10 comprises display unit fixing member (first fixing member) 1 fixed to display unit 51, shelf fixing member 5, and connector 3 interconnecting display unit fixing member 1 and shelf fixing member 5. Connector 3 comprises two parallel plates 3*a* and joint plate 3*b* interconnecting parallel plates 3*a*. Display unit fixing member 1 is rotatably connected to lower ends of parallel plates 3*a* by shaft 2, and shelf fixing member 5 is rotatably connected to upper ends of parallel plates 3*a* by shaft 4. Shaft 2 extends through holes defined in the lower ends of parallel plates 3*a* and holes defined in display unit fixing member 1 which are held in alignment with the holes defined in the lower ends of parallel plates 3*a*. Shaft 4 extends through holes defined in the upper ends of parallel plates 3*a* and holes defined in shelf fixing member 5 which are held in alignment with the holes defined in the upper ends of parallel plates 3*a*. Display unit fixing member 1 and shelf fixing member 5 are thus coupled to each other for rotation with respect to connector 3 within a plane perpendicular to the display screen of display unit 51 and a horizontal plane.

Display unit fixing member 1 may be fixed to display unit 51 by a double-sided adhesive tape, for example. However, display unit fixing member 1 may be fixed to display unit 51 by any of various fixing arrangements. Shelf 53 which is positioned above shelf 52 on which display unit 51 is placed is made of a material capable of attracting a magnet under magnetic forces. Magnet 6 is fixed to shelf fixing member 5. Shelf fixing member 5 and magnet 6 jointly make up a second fixing member which can removably be fixed to shelf 53 at any desired position on its lower surface.

Display unit fixture 10 thus constructed is installed between display unit 51 and shelf 53 disposed thereabove, with display unit fixing member 1 fixed to display unit 51 and magnet 6 fixed to the lower surface of shelf 53 at any desired variable position thereon. Even when vibrations occur when printer 54 discharges a printed sheet and such vibrations are transmitted to shelf 52, display unit fixture 10 prevents display unit 51 from resonating. Therefore, even when vibrations are produced, the user can see displayed images on display unit 51 with ease.

Display unit fixture 10 allows the display panel of display unit 51 to be turned to the left or the right about a vertical axis and also allows the display panel to be tilted from a vertical plane. Even after the display panel is thus turned or tilted, display unit fixture 10 keeps display unit 51 fixed in position. Operation of display unit fixture 10 for moving the display panel of display unit 51 will be described below.

Figure 4:
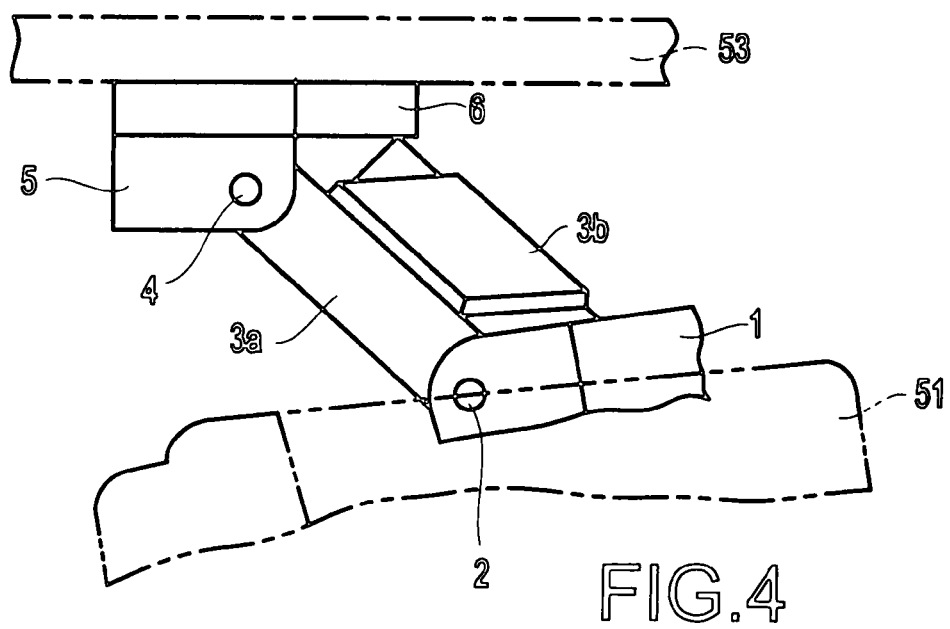
FIG. 4 is a perspective view of the display unit fixture in the position shown in FIG. 3.
Figure 5:
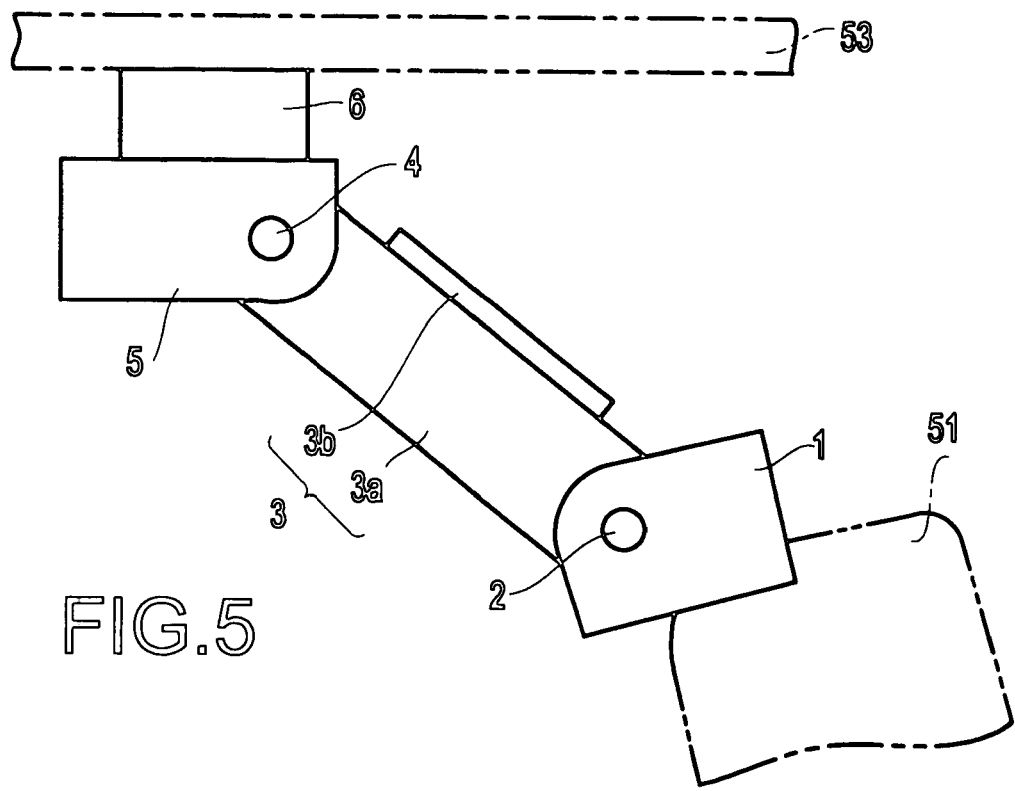
FIG. 5 is a side elevational view of the display unit fixture in the position shown in FIG. 3.

First, a mode of operation of display unit fixture 10 for tilting the display panel within a plane perpendicular to the display screen and a horizontal plane, i.e., for tilting the display screen upwardly or downwardly, will be described below with reference to FIGS. 3 through 5. FIGS. 3 through 5 show the display unit 51 or the display unit fixture 10 when the display screen of display unit 51 which is tilted upwardly from the position shown in FIG. 2.

When the display screen is tilted upwardly or downwardly, display unit fixing member 1 fixed to the upper end of display unit 51 is tilted with respect to the surface of shelf 52 in unison with the display screen and is moved in position. As display unit fixing member 1 is thus tilted and moved, connector 3 is turned about shafts 2 and 4 in the plane perpendicular to the display screen and the horizontal plane and is moved. As connector 3 is thus moved, shelf fixing member 5 and magnet 6 fixed thereto move along the lower surface of shelf 53, the surface of magnet 6 being attracted to and kept along the lower surface of shelf 53. After the display screen is thus tilted, display unit 51 remains fixed to shelf 53 by display unit fixture 10. After the display screen is thus tilted upwardly or downwardly, display unit fixture 10 therefore prevents display unit 51 from resonating.

A mode of operation of display unit fixture 10 for turning the display panel in a horizontal plane, i.e., for orienting the display panel to the left or the right, will be described below with reference to FIGS. 6 through 8.

Figure 6:
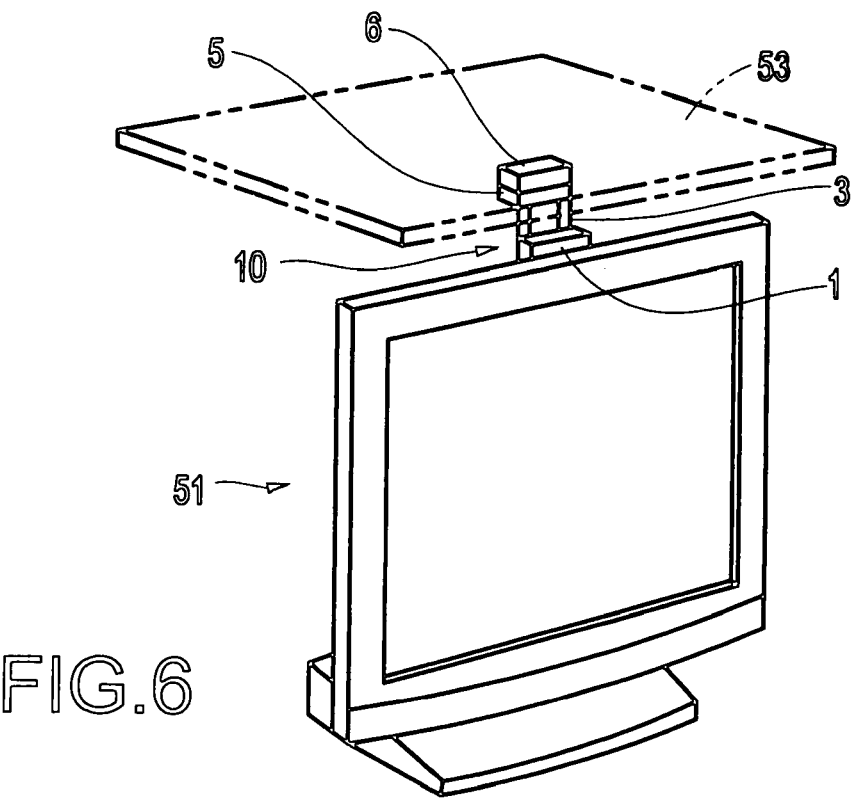
FIG. 6 is a perspective view showing the display screen of the display unit which is oriented in a certain direction.
Figure 7:
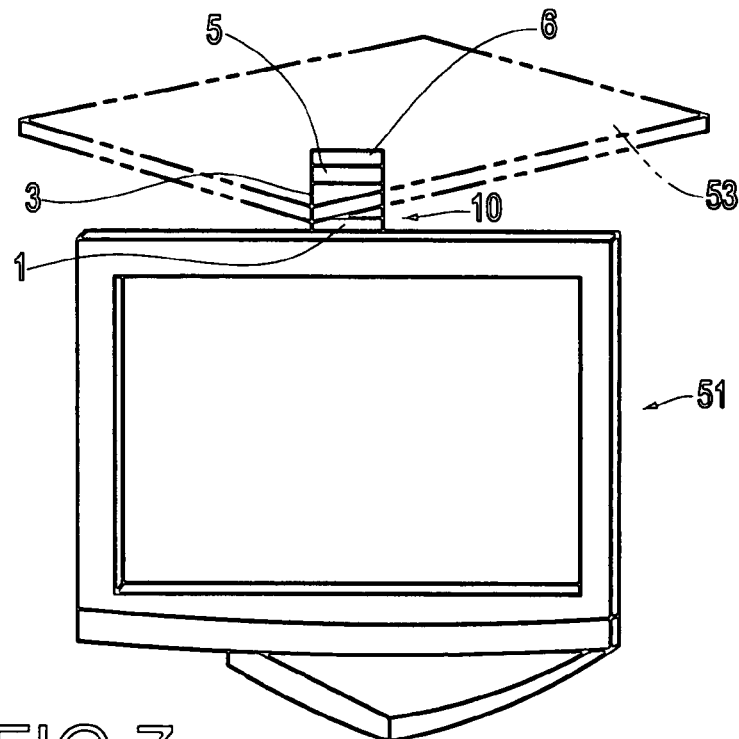
FIG. 7 is a perspective view showing the display screen of the display unit which is turned to the left from the position shown in FIG. 6.
Figure 8:
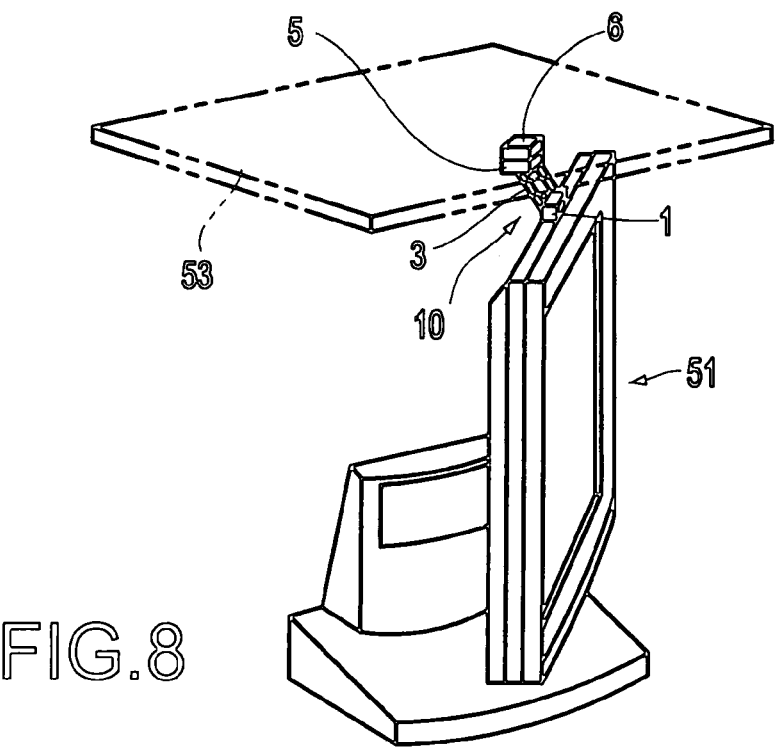
FIG. 8 is a perspective view showing the display screen of the display unit which is turned to the right from the position shown in FIG. 6.

When the display panel is oriented from the position shown in FIG. 6 to the left as shown in FIG. 7, display unit fixing member 1 fixed to the upper end of display unit 51 is turned and moved in unison with the display panel. As display unit fixing member 1 is thus turned and moved, connector 3 is also turned and moved. As connector 3 is thus turned and moved, shelf fixing member 5 and magnet 5 fixed thereto are turned and moved along the lower surface of shelf 53. As a result, after the display panel is turned to the left, display unit 51 remains fixed to shelf 53 by display unit fixture 10. After the display panel is oriented to the left, display unit fixture 10 therefore prevents display unit 51 from resonating.

When the display panel is turned to the right, display unit fixture 10 operates in the same manner as described above. Display unit 51 remains fixed to shelf 53 by display unit fixture 10 after the display panel is oriented to the right as shown in FIG. 8. After the display panel is oriented to the right, display unit fixture 10 therefore prevents display unit 51 from resonating.

When the display panel is turned to the left or the right and at the same time tilted from the vertical plane, the above modes of operation are combined to keep display unit 51 fixed to shelf 53 by display unit fixture 10. Therefore, after the display panel is thus turned and tilted, display unit fixture 10 prevents display unit 51 from resonating.

In the illustrated embodiment, connector 3 comprises members of fixed length. However, connector 3 may be arranged to change its length as the distance between the portion of display unit 51 which is fixed to display unit fixture 10 and the lower surface of shelf 53 is changed when the display screen of display unit 51 changes its orientation.

The display unit to which display unit fixture 10 is attached is not limited to a liquid crystal display unit, but may be any of various other display units, e.g., a CRT display unit.

In the present embodiment, the second fixing member is fixed to the lower surface of shelf 53 by magnet 6, and hence can have its fixed position changed. Generally, however, the second fixing member may be removably fixed to the lower surface of shelf 53 at least at a selected one of plural positions thereon. With such a selective positioning mechanism, if the fixed position of the second fixing member, including its orientation, needs to be changed, then the second fixing member is removed from the present fixed position and fixed to a new fixed position.

In the present embodiment, the first fixing member and the second fixing member are coupled to the respective opposite ends of the connector for rotation within one and the same plane. However, the first fixing member and the second fixing member may be respectively rotatable within any planes including an axis interconnecting the joint of the first fixing member to the connector and the joint of the second fixing member to the connector.

While a preferred embodiment of the present invention has been described in specific terms, such description is for illustrative purposes only, and it is to be understood that changes and variations may be made without departing from the spirit or scope of the following claims.

What is claimed:

1. A computer rack, comprising:
   a first shelf supports a display unit;
   a second shelf disposed above said first shelf and the display unit; and
   a fixture for fixing the display unit, said fixture comprising:
      a first fixing member pivotally connected to a top surface of the display unit situated on said first shelf;
      a second fixing member capable of being removably fixed to a surface of said second shelf; and
      a connector interconnecting said first fixing member and said second fixing member,
   wherein said first fixing member and said second fixing member are rotatably connected to said connector by a first shaft and a second shaft, respectively.

2. The computer rack according to claim 1, wherein said fixture, the display unit and the computer rack are formed in series such that vibration can run through the series.

3. The computer rack according to claim 1, wherein said first fixing member and said second faxing member are connected to said connector for rotation within one and a same plane.

4. The computer rack according to claim 1, wherein said connector has holes defined in opposite ends thereof, and said first fixing member and said second fixing member each have a hole, said fixture defined therein which are held in alignment with said holes defined in the opposite ends of said connector, said first shaft extending through the hole defined in one of the opposite ends of said connector and the hole defined in said first fixing member, and said second shaft extending through the hole defined in the other of the opposite ends of said connector and the hole defined in said second fixing member.

5. The computer rack according to claim 1, wherein said first fixing member is fixed to the display unit by a double-sided adhesive tape.

6. The computer rack according to claim 1, wherein said connector comprises a plurality of substantially parallel plates and a joint plate interconnected to said plurality of substantially parallel plates.

7. The computer rack according to claim 1, wherein said second fixing member comprises:
   a shelf fixing member; and
   a magnet, said magnet being connected to said shelf fixing member and removably connected to a lower surface of a second shelf.

8. The computer rack according to claim 1, wherein said connector provides for the display unit to be pivoted in a horizontal plane.

9. The computer rack according to claim 1, wherein said connector provides for the display unit to be vertically tilted.

10. The computer rack according to claim 1, wherein said fixture maintains the display unit in a fixed position after the display unit is pivoted in the horizontal plane.

11. The computer rack according to claim 1, wherein said connector provides for at least one of a vertical plane and a horizontal plane of rotation of the interconnected display unit.

12. The computer rack according to claim 1, wherein said first fixing member abuts the display unit.

13. The computer rack according to claim 1, wherein said connector is movable in conjunction with said first fixing member.

14. The computer rack according to claim 1, wherein a first distance exists between said first fixing member and said second fixing member, said first distance being proportionally varied as a second distance is changed between the display unit and a surface of the shelf.

15. The computer rack according to claim 1, wherein said first shelf is stationary.

16. A combination, comprising:
   a display unit situated on a first shelf; and a rack comprises second shelf wherein the second shelf is being disposed above the first shelf and the display unit;
   a fixture for fixing said display unit said fixture comprising:
      a first fixing member pivotally connected to a top surface of said display unit;
      a second fixing member capable of being removably fixed to a surface of second shelf and
      a connector interconnecting said first fixing member and said second fixing member,
   wherein said first fixing member transmits the vibration from said display unit to said second fixing member and said second fixing member transmits the vibration from said first fixing member to said rack.

17. The combination according to claim 16, wherein said fixture, said display unit and the computer rack are formed in series such that vibration can run through the series.

* * * * *